Aug. 15, 1939.  N. H. CEDERQUIST  2,169,720
GLASS TILE
Filed March 5, 1938

Inventor
NILS HERMAN CEDERQUIST

By Hazard and Miller
Attorneys

Patented Aug. 15, 1939

2,169,720

UNITED STATES PATENT OFFICE 2,169,720

GLASS TILE

Nils Herman Cederquist, Los Angeles, Calif.

Application March 5, 1938, Serial No. 194,084

9 Claims. (Cl. 72—18)

This invention relates to improvements in the art of setting tile used for ornamenting, finishing, or decorating surfaces such as interior wall surfaces.

An object of the invention is to provide a novel tile and a method for setting or mounting the same.

It has been proposed to use for interior wall tile sections of plate glass which may or may not have a decorative coating applied to the back thereof. Heretofore, various types of ceramic tile have been used but due to the fact that there are a number of limitations on the colors obtainable with the glazing or coloring materials, the use of such ceramic tile is somewhat limited. By using sections of plate glass it is possible to apply enamel coatings to the back of the sections which are baked at a much lower temperature than that required in firing ceramic tile. In this way, by using enamel having a low baking temperature, a multitude of different color effects can be obtained with the tile which cannot be obtained with high temperature ceramic tile.

When a material such as plate glass is used for the body of the tile certain difficulties arise in connection with mounting the tile on its support. It is important in a structure of this character to have the tile so mounted that the back of the tile will not be cemented directly to the supporting structure as the cement contacting the enamel on the back of the tile is apt to disfigure it. It is also important to make suitable provision for expansion and contraction of the individual tiles due to temperature changes and to so mount the tiles that some degree of flexibility is preserved whereby an accidental blow or impact with the tile will not necessarily fracture one or more of the individual tiles.

Specifically, it is an object of the present invention to provide a tile wherein there is a body which may or may not have applied thereto on its rear surface an ornamental coating visible through the body and to provide means on the tile enabling it to be mounted on the supporting backing in such a manner that it will not have cement or the like contacting the coating which might otherwise disfigure it.

It is a further object of the invention to provide a means for setting tile of this character in such a manner as to permit of expansion and contraction of a wall or panel made up of the tile due to temperature changes.

Another object of the invention is to provide a method of setting tile of this character which will enable an individual tile that may have been fractured to be removed and replaced quite readily.

With the foregoing and other objects in view, which will be made manifest in the following detailed description and specifically pointed out in the appended claims, reference is had to the accompanying drawing for an illustrative embodiment of the invention, wherein:

Figure 1:
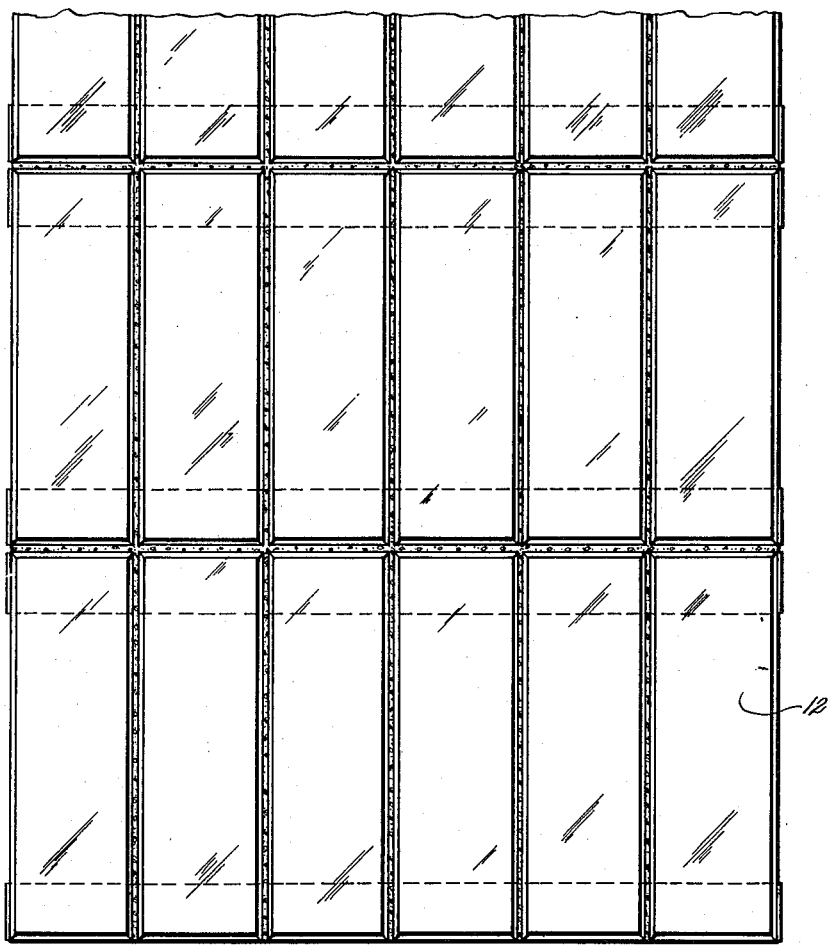
Figure 1 is a partial view illustrating a wall or panel to which the tile embodying the invention have been applied.

Referring to the accompanying drawing wherein similar reference characters designate similar parts throughout, the tile may be applied to any suitable supporting structure but in the preferred embodiment it is applied to a section of five-ply wood veneer indicated at 10. By utilizing such a backing for a support, not only is there a sturdy supporting structure obtained but the material is comparatively inexpansible particularly when the grain of alternate sheets or plys are arranged at right angles to each other. To this supporting structure there is applied a layer of fibrous or woven material such as for example, a layer of burlap 11. This layer is merely cemented by any suitable cement or adhesive over the surface of the ply board 10. The tile employed are in the form of sections of plate glass such sections being designated by the reference character 12. Their forward edges are preferably beveled off with a small bevel as indicated at 13. These body sections of plate glass or the like have a color coating applied to their rear faces and in the preferred form of construction, this color coat is in the nature of an enamel that can be baked at a temperature of approximately 350° F. By utilizing such an enamel not only is the color coat highly stable, but innumerable colors may be employed due to the fact that such enamels can be obtained in practically any color which is not possible with the glazes used in baking ceramic tile at much higher temperatures.

It will be, of course, obvious that other suitable coatings may be employed besides enamel and the invention is in no way restricted to the use of this particular type of coating.

Figure 2:
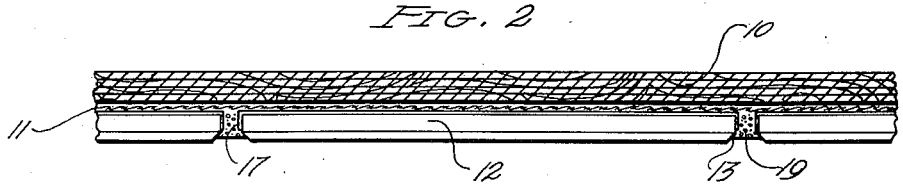
Fig. 2 is a horizontal section through the same.
Figure 3:
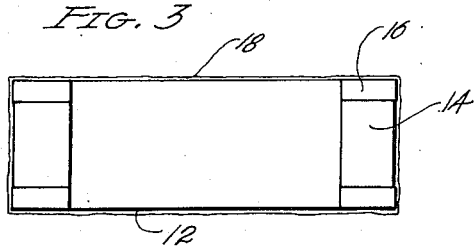
Fig. 3 is a rear view in plan of one of the tile which may be employed in constructing the wall or panel shown in Figure 1.

When the coating has been applied to the rear faces of the plate glass sections, provision is made whereby the tiles may be mounted against the burlap facing 11 in such a manner that the cement used will not contact with the color coating. To this end, strips of kraft paper 14 are provided which are positioned across the rear faces of each tile at the top and bottom thereof. These strips of kraft paper have a lining of metal foil such as for example, aluminum foil applied to their forward faces so that the aluminum foil is positioned directly against the color coating. The strips of paper together with their metal foil lining are attached to the tiles by strips of adhesive tape such as that indicated at 16 with the edges of the adhesive being bent forwardly over the edges of the tile as indicated at 17 on Figure 2. In this way the paper strips 14, together with their metal foil lining form thin metallic barriers against any moisture or cement contacting the back of the color coat on the back of the tile. The tiles as thus constructed then have a compressible coating 18 applied to their edges which coating extends over those portions of the adhesive tape 16 that are adhered to the edges of the plate glass sections. This coating should have a relatively high melting point such as in the neighborhood of 500° F. It should be somewhat waxy in nature and should be slightly compressible. A suitable composition for this coating may be made up of 50% of synthetic resin and 50% of beeswax. This coating is merely applied hot to the edges of the tile and serves to effectively seal.

The tile as thus constructed are in condition to be applied to the fabric facing 11 and to this end cement may be applied to those portions of the adhesive tapes which are exposed on the back of the tile. With spots of cement thus applied to the adhesive each individual tile may be applied to the fabric facing 11 and caused to adhere thereto.

The cement used over the adhesive tape is prevented from coming in contact with the color coating by the metal foil lining so that in no event will the color coat become disfigured. The cement used on the adhesive tape 16 is merely for the purpose of temporarily holding each tile to the fabric facing and in positioning the tile it is advisable to so space them as to provide for relatively wide joints adapted to receive grouts.

When all of the tile have been applied to their proper position on the fabric of burlap facing 11, the joints between the tile are grouted up using a hydrochloric as distinguished from a hydraulic cement. The hydrochloric cement has the effect of expanding slightly on setting. The joints are completely filled with this material and it is caused to penetrate between the threads of the burlap facing 11 and preferably the joints are filled sufficiently so that the grouting material indicated at 19 extends slightly beyond where the bevel starts. In this way the grouting material in the joints has its forward face slightly dovetailed in section and as the grouting material penetrates the burlap facing 11, it locks each tile around its edges to the burlap facing.

The coating 18 being somewhat compressible will be compressed slightly when the grouting cement expands on setting so that the expansion of the grouting cement is not transmitted directly to the plate glass bodies of the individual tiles. Furthermore, when the tile structure is subjected to temperature changes the presence of this compressible coating on the edges of each tile compensates for the expansion and contraction of the entire wall or panel.

If it is desired the coating may have small grooves cut in it on the edges of the tile and the grouting material 19 can be caused to enter these shallow grooves to effectively lock the tiles to the fabric facing 11. By utilizing such grooves it is not necessary to extend the face of the grouting material onto the bevel on each tile.

With each tile being locked onto the fabric facing by the grout in the joints some flexibility of the entire panel or wall is present. While this flexibility is not great it is sufficient to enable each tile to move slightly independently of the remaining tile when the structure is accidentally given quite a severe blow and consequently, accidental breaking of tiles is reduced to a minimum. However, should it occur that one tile becomes chipped or fractured it is possible to remove that tile independently of remaining tile by merely removing the grouting cement 19 surrounding it. As the cement is not attached directly to the glass but there is an intervening compressible coating of a waxy nature, the removal of the tile can be accomplished quite readily.

From the above-described construction it will be appreciated that a novel tile and method for setting tile is provided enabling the use of such brittle material as plate glass to which may be applied when desirable, color or coating. The method enables the temporary mounting of each tile onto the backing in such a manner that no cement comes in direct contact with the color coating. After being temporarily mounted, each tile is permanently attached to the backing by the grout that fills the joints between the tile.

Various changes may be made in the details of construction without departing from the spirit or scope of the invention as defined by the appended claims.

I claim:

1. A tiled panel comprising a layer of fibrous material applied to the surface over which the tile is applied, tiles positioned against the fibrous material, each tile having a beveled outer edge and grouting material penetrating the fibrous material between the tile filling the joints therebetween and extending forwardly onto the beveled edges so as to be dovetailed in form and serving to attach the tiles to the fibrous material.

2. A tile comprising a plate glass body to the back of which is applied a color coat, and strips of material applied over the back of the color coat enabling the application of cement thereto without the cement coming in contact with the color coat, said strips being detached from the color coat, and means for fastening said strips to the glass body.

3. A tile comprising a plate glass body to the back of which is applied a color coat, and strips of material applied over the back of the color coat enabling the application of cement thereto without the cement coming in contact with the color coat, said strips being detached from the color coat, and means for fastening said strips to the glass body at the edges thereof.

4. A tile comprising a plate glass body to the back of which is applied a colar coa, and strips of material applied over the back of the color coat enabling the application of cement thereto without the cement coming in contact with the color coat, said strips being detached from the color coat, and strips of adhesive tape applied to the backs of said strips and bent forwardly over the edges of the glass body and stuck thereto.

5. A tile panel comprising a layer of fibrous material applied to the surface over which the tile is to be applied, tiles positioned against the fibrous material, each tile having a strip of material fastened to the edges thereof but not to the back thereof, cement connecting the backs of said sections of material to the fibrous material, and grouting material between the tiles filling the joints therebetween and penetrating the fibrous material serving to attach the tiles to the fibrous material.

6. A tile panel comprising a layer of fibrous material applied to the surface over which the tile is to be applied, tiles positioned against the fibrous material, each tile having a strip of material fastened to the edges thereof but not the back thereof, cement connecting the backs of said sections of material to the fibrous material, and grouting material between the tiles filling the joints therebetween and penetrating the fibrous material serving to attach the tiles to the fibrous material, each tile having a beveled forward edge and the grouting material extending forwardly onto the beveled edges so as to be dovetailed in form locking the tiles to the fibrous material.

7. A tile comprising a plate glass body to the back of which is applied a color coat, and strips of material applied over the back of the color coat enabling the application of cement thereto without the cement coming in contact with the color coat, said strips being detached from the color coat, means for fastening the strips to the edges of the glass body, and a compressible coating applied to the edges of the glass body.

8. A tile panel comprising a layer of fibrous material applied to the surface over which the tile is to be applied, tiles positioned against the fibrous material, each tile having a strip of material fastened to the edges thereof but not to the back thereof, cement connecting the backs of said sections of material to the fibrous material, a compressible coating on the edges of the tiles, and grouting material between the tiles filling the joints between the compressible coatings thereon and penetrating the fibrous material serving to attach the tiles to the fibrous material.

9. A tile panel comprising a layer of fibrous material applied to the surface over which the tile is to be applied, tiles positioned against the fibrous material, each tile having a strip of material fastened to the edges thereof but not to the back thereof, cement connecting the backs of said sections of material to the fibrous material, a compressible coating on the edges of the tiles, and grouting material between the tiles filling the joints between the compressible coatings thereon and penetrating the fibrous material serving to attach the tiles to the fibrous material, each tile having a beveled forward edge and the grouting material extending forwardly onto the beveled edges so as to be dovetailed in form locking the tiles to the fibrous material.

NILS HERMAN CEDERQUIST.